United States Patent [19]

Gerresheim

[11] 4,339,016
[45] Jul. 13, 1982

[54] TILTABLE FENDER FOR A TRACTOR LOADER

[75] Inventor: Jost Gerresheim, Libertyville, Ill.

[73] Assignee: International Harvester Co., Chicago, Ill.

[21] Appl. No.: 196,248

[22] Filed: Oct. 14, 1980

Related U.S. Application Data

[63] Continuation-in-part of Ser. No. 1,972, Jan. 8, 1979, abandoned.

[30] Foreign Application Priority Data

Jan. 13, 1978 [DE] Fed. Rep. of Germany ... 7800896[U]
Jan. 10, 1979 [FR] France ................................. 79 00528
Feb. 9, 1979 [CA] Canada ................................. 321182

[51] Int. Cl.³ ........................................... B62D 25/16
[52] U.S. Cl. ............................ 180/89.17; 280/152 R
[58] Field of Search .................... 180/89.17, 89.18; 280/152 R, 153 R; 296/192

[56] References Cited

U.S. PATENT DOCUMENTS

| | | | |
|---|---|---|---|
| 2,487,217 | 11/1949 | Brigham | 280/152 R |
| 2,582,839 | 1/1952 | Lippard et al. | 280/152 R |
| 2,868,310 | 1/1959 | Lee | 180/89.17 |
| 3,179,201 | 4/1965 | May et al. | 180/89.17 |
| 3,933,216 | 1/1976 | Irwin | 180/89.17 |

*Primary Examiner*—Robert R. Song
*Attorney, Agent, or Firm*—D. K. Sullivan; F. D. Au Buchon

[57] ABSTRACT

A two-piece fender for a tractor loader, wherein one piece, which is located in the vicinity of the engine compartment, is tiltable laterally outwardly and downwardly therefrom to permit easier access to the engine for maintenance and servicing, after an engine compartment cover covering the engine is opened for gaining access to the engine compartment.

7 Claims, 10 Drawing Figures

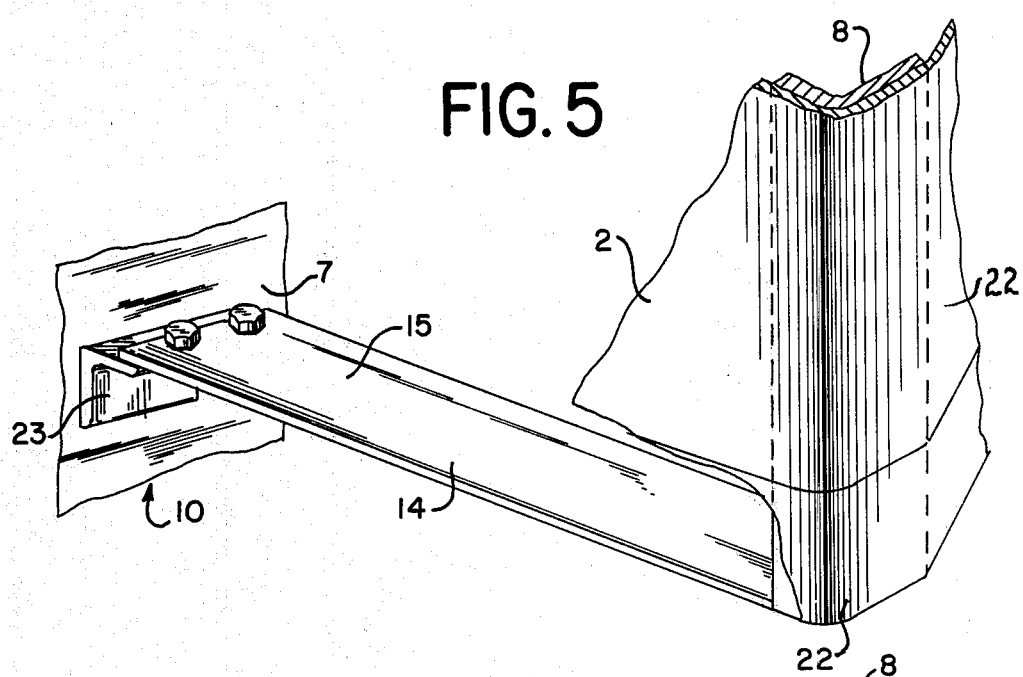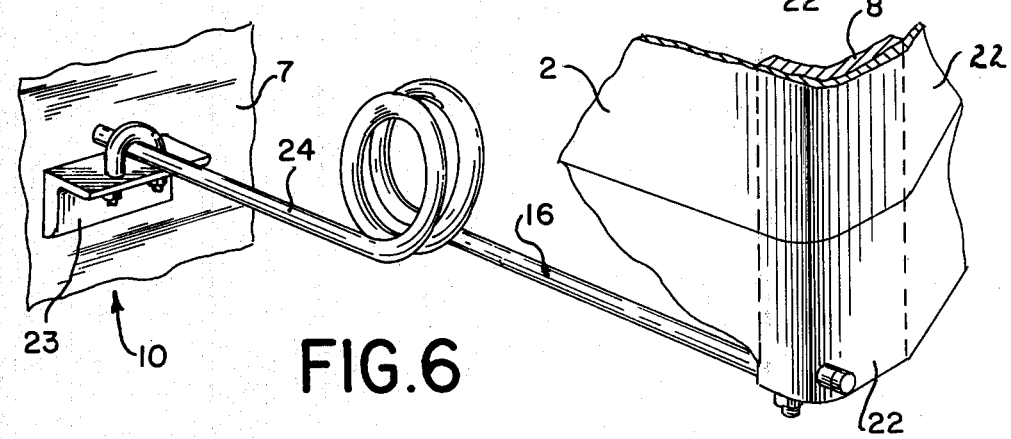

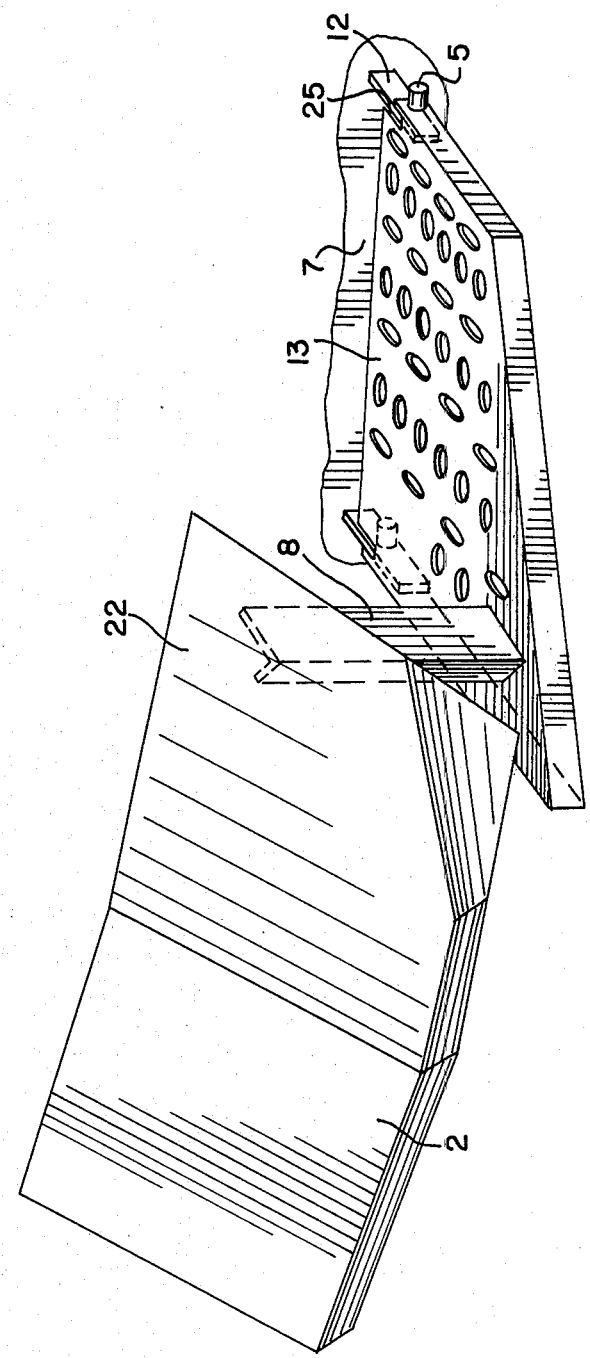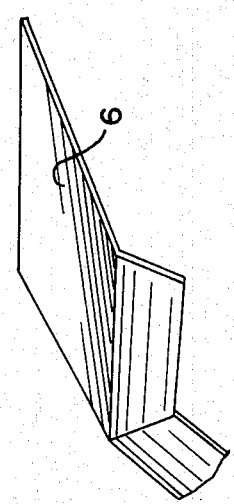
FIG. 7

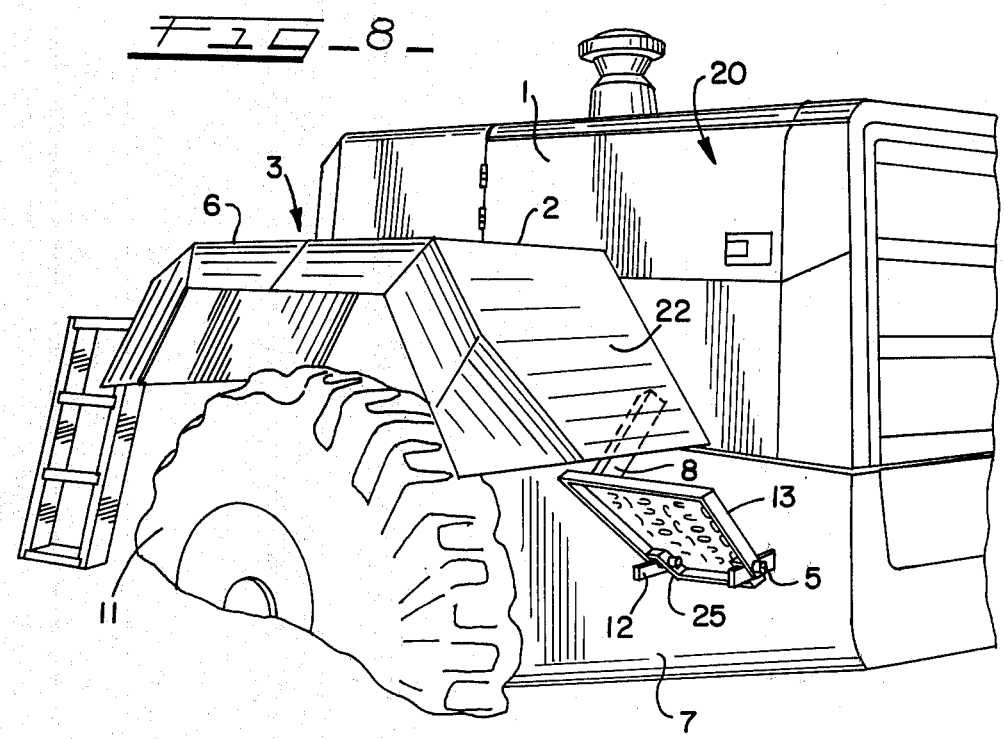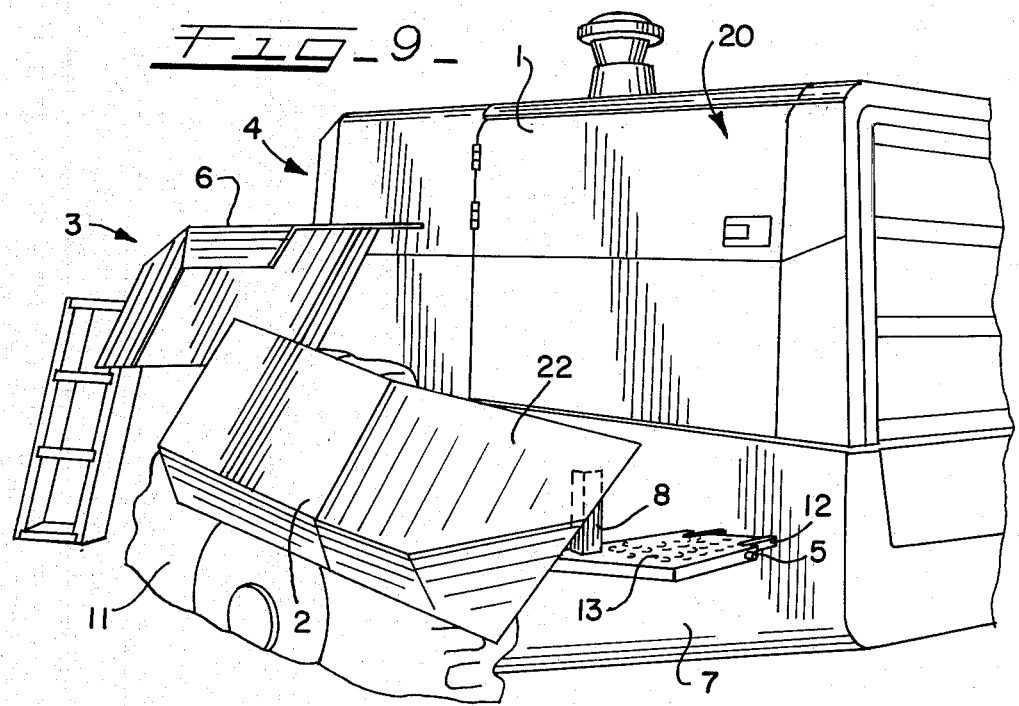

TILTABLE FENDER FOR A TRACTOR LOADER

This is a continuation in part of U.S. patent application Ser. No. 001,972, filed on Jan. 8, 1979, now abandoned.

FIELD OF THE INVENTION

This invention relates to tiltable fenders for utility vehicles having hinged hood doors or cowlings covering engine compartments for noise abatement.

DESCRIPTION OF THE PRIOR ART

From the German Gebrauchsmuster (D.G.M.) No. 1,976,093, of Dec. 28, 1967, it is known to swing a rearwardly portion of a mudguard, normally covering an upper quarter of the periphery of the wheel, about a parallel axis to the wheel axis in order to provide clearance for access to the mounting or unhitching of implements mountable to hitch supports carried on the axle between the wheels of an agricultural type of motor vehicle. The displacement of the mudguard is effected by swinging the mudguard about a pivotal support, or about an arcuate stationary support, or by pulling a flexible mudguard up through an associated supporting strut, after releasing a locking bolt. The vertical clearance, which has been obtained by pivoting or by pulling up the rear section of the mudguard out of the way, is adequate to be able to mount or dismount implements between the wheels on the axle. However, in the horizontal direction, the longitudinal clearance is insufficient to allow at least a partial lateral swinging of a hinged hood door or engine compartment cowling provided on utility vehicles, such as rubber tired tractor loaders, if service work is required on the internal combustion engine, which is located in the vicinity above the fender. In case of fenders, which are provided with draping edge or skirt sections for stability, you cannot apply the known mudguard removal principle in the design of a section of a wheel fender which can be pulled up, out of the way, on top of a stationary fender section, because the folded skirted edge or part of the movable fender section would be in the way of the draped lateral sides of the stationary fender section.

From the German Laid Open (D.O.S.) or Printed Patent Application No. 2,504,713—Westmeyer—Aug. 19, 1976—it is known that, after releasing a bearing, the entire vehicle body comprising an operator's cabin, fenders, and engine cowling, of a motor truck vehicle, is laterally tilted upwardly and away from the engine compartment, around a longitudinal axis extending approximately at the level of the bottom edges of the fenders, on one side of the vehicle, in order to perform service and repair work in the engine compartment. To apply this vehicle body tilting procedure to a tractor loader body, which is substantially larger than an inner city use motor truck, the design-wise expenditure involved would be too costly and impractical since only one section of the fender, which is in the vicinity of the engine compartment, is usually in the way of access to the internal combustion engine.

In U.S. Pat. No. 2,868,310—Lee—Jan. 13, 1959, a lateral side of a truck body, which also includes an entire wheel fender, is swung laterally outwardly and forwardly for gaining access to the engine compartment. In U.S. Pat. No. 3,174,575—May et al.—Mar. 23, 1965, a tiltable hood, which also includes the entire front wheel fenders, is swung longitudinally outwardly and forwardly for gaining access to the engine compartment. The prior art lateral swinging of the entire lateral body side, or the longitudinal pivoting of the entire hood, which include entire wheel fenders, applied to a tractor loader would be impractical as only one half, or a portion, of the fenders on a tractor loader extend beneath the engine compartment. This is shown in U.S. Pat. No. 3,933,216—Irwin—Jan. 20, 1976. In the Irwin patent there is no problem with access to the engine compartment as the sides of the engine compartment are not covered. The portion of the fender which would normally extend underneath the engine compartment has been omitted and a step has been added on the chassis of the tractor loader to gain access to the engine compartment. None of the three United States patents teach the pivoting or tilting of a portion or section of a fender, which section would normally interfere with access to the engine compartment, or for using the means for supporting and tilting the tiltable fender section additionally as a step for gaining access to the engine compartment once the fender is tilted away therefrom.

SUMMARY OF THE INVENTION

This invention is based on the objective of providing a pivotable or tiltable fender section, on one or both sides of a rubber tired tractor loader or utility vehicle, wherein at least two of the wheels of the utility vehicles are located in an area below and along the engine compartment and there are means for enclosing the compartment which may be a hinged hood door or cowling covering the compartment for noise abatement. With the subject tiltable or pivotable fender section, it is possible to obtain a comparatively wide, horizontal clearance extending over substantially the width of the engine compartment over which the engine cowling covers or hinged hood doors enclose. The fender section can be tilted, or swung away, from the path of the hood door, as it is swung open to gain access to the interior of the internal combustion engine compartment.

According to the invention, the problem with hinged hood doors, and the problem with a section of the wheel fenders interfering with access to the engine compartment is solved by a sectioned two-part fender, wherein at least one section of the two-part fender, which is the section located in the area below and extending along the engine compartment, is swingable or tiltable laterally outwardly from the chassis of the tractor loader and downwardly away from the swingable hood door and the engine compartment toward the rubber tired wheel, about a horizontal axis extending below the level of the bottom edge of the two-part sectioned fender. Because the tiltable or swingable fender section is movable about a horizontal axis extending in the longitudinal direction of the vehicle, the clearance increases parallel to the cowling or hood enclosed engine compartment, as the movable fender section is moved laterally outwardly and downwardly, thereby developing an increasing and adequate clearance for swinging the hinged door and for gaining access to the engine compartment after the means for covering the engine compartment is moved away from the compartment. Thus an interference is also prevented between the draped and folded skirt edge and side sections of the two-part sectioned fender. Means are also provided for locking the movable fender section to the stationary fender section. The stationary fender section is longitudinally spaced from the engine compartment and therefore does not interfere with access to the engine compartment. It is fixedly mounted to the chassis.

Accordingly, there is provided in a rubber tired tractor loader, having a chassis, an engine compartment supported on the chassis. A plurality of ground engaging rubber tired wheels supporting the chassis. Means for covering the compartment is hinged to the chassis and covers the compartment. At least one rubber tired wheel each of the plurality and including a fender therefor is located at opposite lateral sides of the tractor loader below the compartment and the covering means. The fenders have two sections, one section is a stationary fender section mounted to the respective sides of the chassis and is longitudinally spaced from the means covering the compartment, the second section is a tiltable fender section extending longitudinally from the stationary fender section below and spanning a substantial portion of the means covering the compartment. Fender section locking means are provided for locking the two fender sections together. There are supporting means for tiltably mounting each of the second fender section to the respective side of the chassis. A supporting strut is connected to the supporting means and has an upward end connected to a depending skirt portion of the second fender section. The supporting strut is connected to an outboard end of the supporting means. The supporting means includes inboard means for permitting laterally downwardly tilting of the supporting strut and connected second fender section upon unlocking of the two fender sections, thereby gaining access to the compartment after moving the means covering the compartment and uncovering the compartment.

In one embodiment of the invention, the inboard end means of the supporting means is connected to a swivel joint means which is mounted to the respective sides of the chassis thereby permitting lateral downward pivoting of the supporting means from a horizontal position to an oblique position of approximately 30°, where an edge of the depending skirt portion of the second fender section abuts against its respective rubber tired wheel.

In a still further embodiment of the invention, the inboard end means of the supporting means is pivotally connected to a detent means mounted to the respective sides of the chassis thereby providing lateral downward swinging of the supporting means from an oblique position of approximately 30° to a horizontal position, where the inboard end abuts against the detent means and the horizontal supporting means form the step means for the easier access of the uncovered compartment. The supporting means may be in the form of a treadboard having the outboard end connected to the downward end of the supporting strut and the inboard end pivotally connected to a longitudinally spaced pair of the detent means.

In a still further embodiment of the invention, the inboard end means of the supporting means can be a flexible end of a spring body having the outboard end connected to the downward end of the supporting strut and the inboard end clamped to a bracket mounted to the respective sides of the chassis, thereby permitting a lateral downward swinging of the second fender section to an oblique position of approximately 30° wherein each of the depending skirt portion of the second fender section abuts against its respective rubber tired wheel. The spring body may be an elongated flat bar or it may be an elongated round rod having a coil portion intermediate the inboard and outboard ends.

The above and other objects and advantages of the invention will be apparent from a reading of the ensuing description of an illustrative embodiment of the invention with reference being made to the accompanying figures of the drawing, wherein:

FIGS. 5 and 6 are partial isometric right side views of a resilient tiltable fender section supporting means in the form of flat and coil spring members; and FIGS. 7, 8 and 9 are partial isometric left side views of a second mounting arrangement of the FIG. 4 treadboard supported tiltable fender section.

DESCRIPTION OF THE PREFERRED EMBODIMENT

Figure 1:
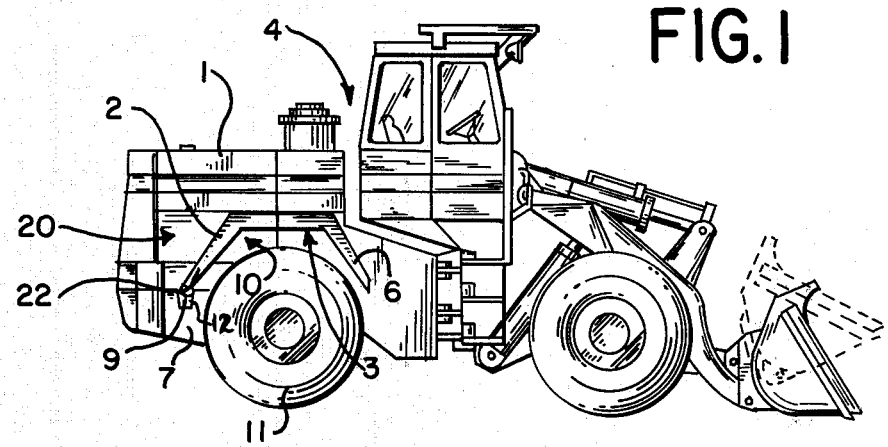
FIG. 1 is a right side view of an articulated front end rubber tired tractor loader with a sectioned fender in the area of a hinged door or pivoted cowling enclosing an engine compartment.
Figure 2:
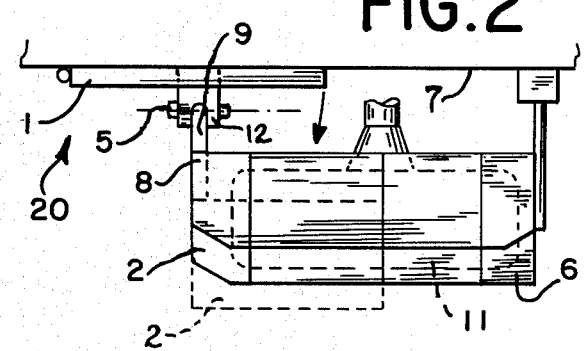
FIG. 2 is a partial top view of the sectioned fender shown in FIG. 1.

A utility vehicle in the form of a rubber tired tractor loader 4 is shown in FIG. 1. An engine compartment 20 is enclosed by covering means 1 for noise abatement. The engine compartment 20 is located at the rear of the vehicle 4. A two piece sectioned wheel guard or fender 3 is provided above the powered rear wheels 11, laterally spaced to the engine compartment 20 and hood door or cowling 1, on one or both sides of the vehicle 4. The wheel guard or fender 3 is divided, approximately in the middle, and comprises a stationary or fixed fender section 6, which is connected to the chassis and is longitudinally spaced from the engine compartment, and a tiltable or pivotable fender section 2 which is located laterally adjacent and below the engine compartment 20. The tiltable fender secton 2 is located below the area of that section of the engine compartment covering means 1, which can be opened either by laterally swinging, in the case of a hinged hood door 1 shown in FIGS. 3, 4A, 8 and 9 or by longitudinally swinging, in the case of a pivotable cowling 1 shown in U.S. Pat. No. 3,982,600—Gerresheim et al.—Sept. 28, 1976, in order to open the engine compartment 20 for servicing or maintenance.

Figure 3:
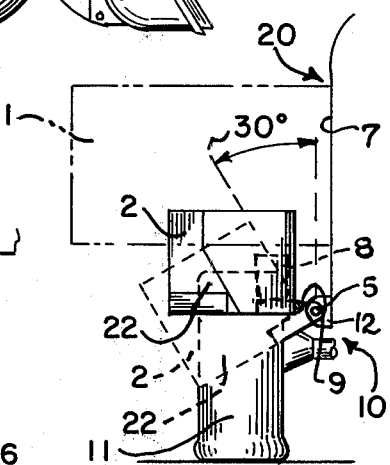
FIG. 3 is a partial rear left view of the sectioned fender.

The pivotable fender section 2 is located, as mentioned previously, in the pivotable or tiltable area of the engine cowling compartment covering means 1, and is arranged in a tiltable or pivotable manner, in a laterally outwardly and downwardly direction, around an axis 5, extending in the longitudinal direction of the vehicle 4. The tiltable fender section 2 is supported by an upwardly extending strut 8, connected to a tiltable fender supporting means 9 which, in one embodiment is a rigid bar which extends laterally and horizontally toward the side of the vehicle chassis 7. The upwardly extending end of the strut 8 is mounted to a depending reinforced metal skirted portion 22 of the pivotable fender section 2. The inboard end of the rigid bar tiltable fender supporting means 9 is pivotally mounted on bearing 5 to a detent or bracket 12 which is connected to the side of the chassis 7. As shown in FIG. 3, the tiltable fender section 2 of this embodiment can be tilted approximately 30°, about bearing 5, from its standard position, until the depending skirt portion 22 abuts with the rubber tired wheel 11.

Figure 4:
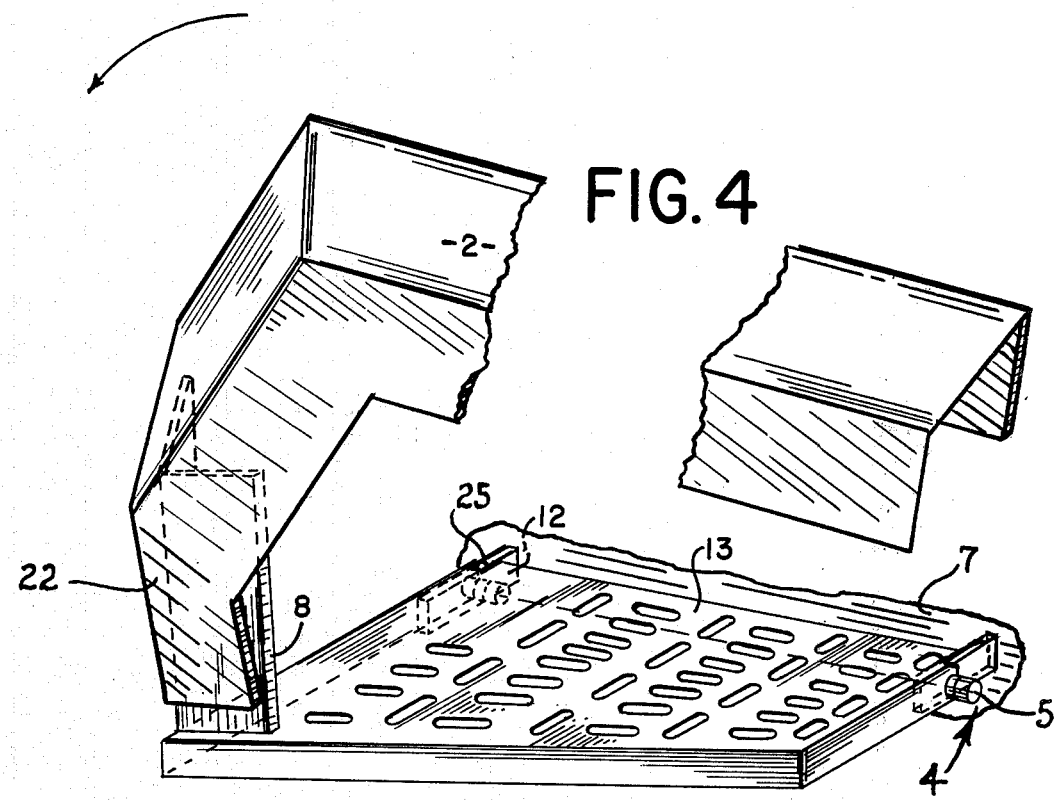
FIG. 4 is a partial isometric right side view of a treadboard supporting a tiltable fender section of the sectioned fender.
Figure 4A:
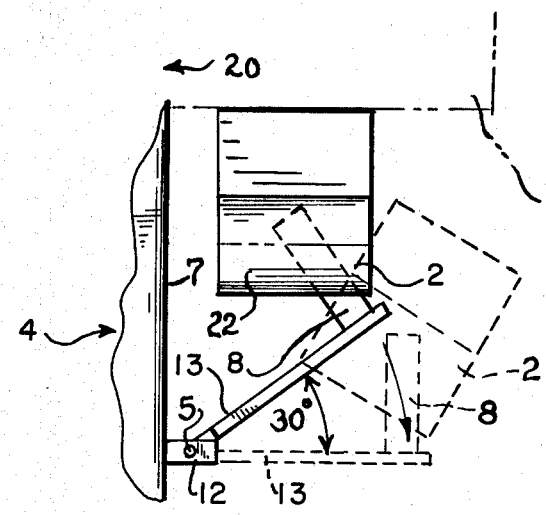
FIG. 4A is a partial rear view of the treadboard supported tiltable fender section shown in FIG. 4.

In the embodiment shown in FIGS. 4, 4A, 7, 8 and 9 the tiltable fender supporting means is in the form of a treadboard 13, which is pivotally mounted on bearings 5 to a pair of longitudinally spaced apart detent means or brackets 12. The treadboard 13, as shown in FIGS. 4A and 8, is inclined at approximately 30° in the normal non-tilted position of the tiltable fender section 2. As shown in FIG. 4A, the oblique extending treadboard is pivotable through 30°, about bearing 5, to a horizontal position whereby the tiltable fender section 2 is swung laterally and downwardly away from the engine compartment 20 and the path of the swingable hinge door 1. In the tilted position of the fender section 2, shown in FIGS. 4, 7 and 9, the treadboard 13 may be stepped upon for gaining access to the engine compartment 20. Slots or a cut away portion 25 are provided in the treadboard 13 for clearing the detent or bracket 12. In FIG. 4, the length of the treadboard 13 is such that it clears the tire 11 in both the inclined and horizontal positions.

In FIGS. 7-9 the length of the treadboard 13 is not critical as it is mounted on the outside of the depending skirt 22 of the tiltable fender section 2.

FIG. 5 shows a modified embodiment of the tiltable fender support means, which is in the form of a resilient or flexible flat spring 14 having an inboard end 15 firmly clamped to a bracket 23 attached to the chassis 7 in the wheel well 10, of the vehicle 4 and the outboard end connected to the strut 8. In this embodiment, the tiltable fender section 2 is tilted downwardly and outwardly by bending the resilient tiltable fender support means or flat spring 14.

A modified embodiment of the resilient tiltable fender support means is shown in FIG. 6, wherein the resilient tiltable fender supporting means is in the form of a torsion or coil spring 16, or tubular bar member, which is coiled intermediate the inboard and outboard ends thereof. The inboard end 24 is clamped to the bracket 23 attached to the chassis 7 in the wheel well 10 and the outboard end is mounted to the strut.

Suitable fender locking means, not shown, are provided for all of the embodiments and modifications of the tiltable fender support means for locking the movable fender section 2 to the stationary fender section 6, in the normal or non-tilted position of the tiltable fender section 2.

What is claimed is:

1. A rubber tired tractor loader having a chassis, an engine compartment supported on the chassis, a plurality of ground engaging rubber tired wheels supporting the chassis, an engine compartment enclosing means hinged to the chassis and covering the compartment, at least one rubber tired wheel each of the plurality and including a fender therefor located at opposite lateral sides of the tractor loader below the compartment and the enclosing means, wherein the improvement comprises:

the fenders having two sections, one section is a stationary fender section mounted to respective sides of the chassis and is longitudinally spaced from the enclosing means, the second section is a tiltable fender section extending longitudinally from the stationary fender section below and spanning a substantial portion of the enclosing means;

means for locking the two fender sections together;

supporting means for tiltably mounting each second fender section to the respective sides of the chassis and including a supporting strut having an upward end connected to a downward skirt portion of the second fender section and having a downward end connected to an outboard end of the supporting means, the supporting means including inboard end means for permitting laterally downwardly tilting of the supporting strut and connected second fender section upon unlocking of the two fender sections for gaining access to the enclosing means and to the compartment after moving the enclosing means and uncovering the compartment.

2. A rubber tired tractor loader according to claim 1, wherein the inboard end means in connected to a swivel joint means mounted to the respective sides of the chassis permitting laterally downwardly pivoting of the supporting means from a horizontal position to an oblique position of approximately 30 degrees where an edge of the depending skirt portion of the second fender section abuts against its respective rubber tired wheel.

3. A rubber tired tractor loader according to claim 1, wherein the inboard end means is pivotally connected to a detent means mounted to the respective sides of the chassis permitting laterally downwardly swinging of the supporting means from an oblique position of approximately 30 degrees to a horizontal position where the inboard end abuts against the detent means and the horizontal supporting means forms a step means for easier access to the uncovered compartment.

4. A rubber tired tractor loader according to claim 3, wherein the supporting means is a treadboard having the outboard end connected to the downward end of the supporting strut and the inboard end pivotally connected to a longitudinally spaced pair of the detent means.

5. A rubber tired tractor loader according to claim 1, wherein the inboard end means is a flexible end of a spring body comprising the supporting means and having the outboard end of the spring body connected to the downward end of the supporting strut and the inboard end clamped to a bracket mounted to the respective sides of the chassis permitting laterally downward swinging of the second fender section to an oblique position of approximately 30 degrees where an edge of the depending skirt portion of the second fender section abuts against its respective rubber tired wheel.

6. A rubber tired tractor loader according to claim 5, wherein the spring body is an elongated flat bar.

7. A rubber tired tractor loader according to claim 5, wherein the spring body is an elongated round rod having a coiled portion intermediate the inboard and outboard ends.

* * * * *